United States Patent
Swindler

(10) Patent No.: US 7,534,472 B2
(45) Date of Patent: May 19, 2009

(54) TREATING METAL SURFACES WITH COATING MATERIAL

(75) Inventor: Gary Charles Swindler, Jacksonville, TX (US)

(73) Assignee: Century Industrial Coatings Incorporated, Jacksonville, TX (US)

( * ) Notice: Subject to any disclaimer, the term of this patent is extended or adjusted under 35 U.S.C. 154(b) by 431 days.

(21) Appl. No.: 11/357,269

(22) Filed: Feb. 17, 2006

(65) Prior Publication Data

US 2007/0036907 A1 Feb. 15, 2007

Related U.S. Application Data

(60) Provisional application No. 60/706,830, filed on Aug. 9, 2005.

(51) Int. Cl.
*B05D 7/16* (2006.01)

(52) U.S. Cl. .................... 427/388.1; 427/388.4

(58) Field of Classification Search .......... 427/388.1, 427/388.4
See application file for complete search history.

(56) References Cited

U.S. PATENT DOCUMENTS

| 4,233,362 A | * | 11/1980 | Novak et al. ............. 428/332 |
| 5,538,760 A | * | 7/1996 | Sharma ................... 427/388.4 |
| 6,037,014 A | * | 3/2000 | Edgington ................ 427/544 |
| 6,106,901 A | | 8/2000 | Song et al. |
| 6,875,479 B2 | | 4/2005 | Jung et al. |
| 2004/0022951 A1 | | 2/2004 | Maurus |

* cited by examiner

*Primary Examiner*—Erma Cameron
(74) *Attorney, Agent, or Firm*—McAfee & Taft

(57) ABSTRACT

The present invention generally relates to an aqueous coating material with low VOC (Volatile Organic Compounds) and essentially zero HAP (Hazardous Air Pollutants) suitable for coating a metal surface, a method for treating metal, particularly steel, surfaces of a structure such as a joist with such aqueous coating material, and use of such aqueous coating material to treat metal surface to provide protection against corrosion particularly during delivery, storage on site, assembly, and erection in an atmosphere.

14 Claims, No Drawings

TREATING METAL SURFACES WITH COATING MATERIAL

CROSS REFERENCE TO RELATED APPLICATION

This application claims priority from provisional application No. 60/706,830, filed Aug. 9, 2005 by Gary Charles Swindler.

FIELD OF THE INVENTION

The present invention generally relates to an aqueous coating material with low VOC (Volatile Organic Compounds) and essentially zero HAP (Hazardous Air Pollutants) suitable for coating a metal surface, a method for treating metal, particularly steel, surfaces of a structure such as a joist with such aqueous coating material, and use of such aqueous coating material to treat metal surface to provide protection against corrosion particularly during delivery, storage on site, assembly, and erection in an atmosphere.

BACKGROUND OF THE INVENTION

Although a wide variety of coatings is available for coating or painting metal surfaces of subjects, an ideal coating system—one with all the desired performance properties, simple application, and low cost—is difficult to find. Many factors such as the purpose of coating, costs, government regulations, service environment, subject [also called substrate] and service conditions, basic functions, and application limitations must be considered.

Corrosions of metals, such as steel and iron, occur in all environments. Needs are different for different metal, different substrate [subject], different service environment, and the different period required for having protection. In addition, one must consider properties like resistance to heat, cold, sunlight, weathering and other conditions during the time the protection is needed.

In addition to all of these requirements, low VOC and/or low HAP paints or coatings using water as a carrier instead of petroleum-based solvents are becoming more desirable as both the society, the users and the manufacturer look for ways to reduce and minimize impacts on the environment when such coatings or paints are used. The levels of emissions from aqueous coating systems are lower than those from solvent-borne surface coatings.

Coatings are routinely applied to metal surfaces or surfaces of metal subjects to provide various protections. Many metal subjects may only need short-term protection against corrosion or rusting when these subjects are being delivered, stored on site, and being assembled or erected. This particularly true for steel subjects like open web and long span steel joists and joist girders, structural steel, cold formed steel framing and others.

It is therefore desirable to have a water based coating material with low VOC and essentially HAP free and at the same time the aqueous coating can be conveniently applied to structural metal parts such as steel joist by dipping, flow painting, spraying and other similar methods.

SUMMARY OF THE INVENTION

This invention relates generally to a method for treating metal, such as steel, surfaces to provide at least some temporary or short-term protection against corrosion during delivery, storage on site, and erection in an atmosphere comparable with The Society for Protective Coatings SSPC (Steel Structures Painting Council) Environmental Zone 1, normal dry. For instance, the invention can be used as a method to apply a temporary holding primer or coating to prevent or retard the rusting of steel joists. Such temporary holding primer or coating may or may not be removed before or after erection or assembly in the field.

It is an object to provide a method for treating a metal surface with an aqueous coating material comprise (A) providing the aqueous coating material; (B) making an application of the aqueous coating material to the metal surface; (C) removing any excess of the aqueous coating material; and (D) drying the coating. In this method, the aqueous coating material comprises water, at least one resin, and at least one emulsifier. The resin is made up of one or more polymerized C5 and/or C9 hydrocarbons wherein the C5 /C9 hydrocarbons were polymerized in situ with a drying oil. Some commercially available examples of suitable resins are Versadil® 100, Versadil® 200, Versadil® 1100, Versadil®2200, DOC H/S and DOC HIS LV resin. These resins are characterized as having at least one copolymer containing having at least one diallylic group and at least 50% of one or more long-chain di-unsaturated acids such as linoleic acid 35% of one or more long-chain monounsaturated acids such as linolenic acid, oleic acid, and others. The Versadil® and other resins are characterized by a density of 7.8 pounds per gallon (0.936 kg per liter) to 8.2 pounds per gallon (0.984 kg per liter), a Gardner Color of 3-9+, less than 1% volatile matter after 2 hours @ 100° C., and a viscosity of 600-1700 centipoise @25° C. and the aqueous coating material is characterized by a solids content in the range of from about 50% to about 70% by weight, from about 35% to about 55% by volume; a VOC content of not more than 120 grams per liter excluding water; and a viscosity in the range of from about 14" to about 20" as measured by #2 Signature Zahn Cup. Versadil is a registered trademark of Neville Chemical Company.

It is another object of the present invention to provide a method for treating surface of a metal subject such as a steel joist by dipping.

It is yet another object of the present invention that the resin (binder) of the aqueous coating material is characterized by a density of 7.8 to 8.2 pounds per gallon, a Gardner Color of 3-9+; less than 1% volatile matter after 2 hours @ 100° C., and a viscosity of 600-1700 centipoise @ 25° C.

It is a further object of the present invention to provide an aqueous coating material which further comprises one or more components selected from the group consisting of a biocide, an adhesion promoter, a corrosion inhibitor, a wetting agent, and mixtures thereof.

It is an object of the present invention to use an aqueous coating material to treat a metal surface of a subject and the treatment comprises: (A) providing the aqueous coating material; (B) making an application of the aqueous coating material to the metal surface; (C) removing any excess of the aqueous coating material from the subject; and (D) drying; wherein the aqueous coating material comprises water, at least one resin, and at least one surfactant; the resin (also called binder) is selected from a group consisting of Versadil® 100, Versadil® 200, Versadil® 1100, Versadil® 2200, DOC H/S and DOC H/S LV resin or characterized by a density of 7.8 per gallon (0.936 kg per liter) to 8.2 pounds per gallon (0.984 kg per liter), a Gardner Color of 3-9+, less than 1% volatile matter after 2 hours @ 100° C., and a viscosity of 600-1700 centipoise @ 25° C. and the aqueous coating material is characterized by a solids content in the range of from about 50% to about 70% by weight, from about 35% to about 55% by volume; a VOC content of not more than 120 grams per liter excluding water; and a viscosity in the range of from about 14" to about 22" as measured by #2 Signature Zahn Cup.

It is a further object that the application is selected from dipping, flow painting, and/or spraying.

It is yet another object that the finished surface of a metal subject is cleaned prior to application of the aqueous coating material.

It is an advantage of using the present invention that the metal surface, particularly steel surface, thus treated has an excellent corrosion protection 100 or more hours of salt spray resistance in accordance with and as measured by the testing method ASTM-B-117.

It is another advantage that the aqueous coating material has less than 1.0 pound per gallon (0.12 kg/liter) of volatile organic compounds (VOC).

It is a further advantage that the coating material is essentially Hazardous Air Pollutant (HAP) free, i.e. HAP being essentially not detectable or 0.

It is yet another advantage that the aqueous coating material can be used as a single coat, multi-coat, and/or a primer. In other words, another coat of the same or a different coating material/paint can be coated on top of the first coat. Single coat can be single dip.

It is further an advantage that the aqueous coating shows outstanding stability over time while in storage. This is particularly important when a dipping is used as a preferred application method for structural steel subject like a joist.

DETAILS OF THE INVENTION

The present invention involves treatment of a metal structure/metal surface, particularly ferrous metals such steel, stainless steel, iron, cast iron and the like.

An aqueous based coating material useful for the present invention. The aqueous coating material comprises water, at least one resin, at least one surfactant or emulsifier, optionally one or more components selected from the group consisting of one or more biocides, one or more pigments, one or more adhesion promoters, one or more corrosion inhibitors, one or more wetting agents, and mixtures thereof.

Many different resins can be used for the coating material. A suitable resin (binder) is characterized in that it has a density of 7.8 pounds per gallon (0.936 kg per liter) to 8.2 pounds per gallon (0.984 kg per liter), a Gardner Color of 3–9+, less than 1% volatile matter after 2 hours @100° C., and a viscosity of 600-1700 centipoise @ 25° C. A resin comprises one or more polymerized C-5 and/or C-9hydrocarbons and a liquid drying oil. The resin is made up of one or more polymerized C5and/or C9 hydrocarbons wherein the C5/C9 hydrocarbons were polymerized in situ with a drying oil. Some commercially available examples of suitable resins are Versadil® 100, Versadil®200, Versadil® 1100, Versadil® 2200, DOC H/S and DOC H/S LV resin. These resins are characterized as having at least one copolymer containing having at least one diallylic group and at least 50% of one or more long-chain di-unsaturated acids such as linoleic acid 35% of one or more long-chain monounsaturated acids such as linolenic acid, oleic acid, and others. A preferred surfactant (or emulsifier) is a sorbitan fatty ester such as ATSURF® S-80 emulsifier, DeMuls KE-75 or a fatty acid such as Sylfat® FA-1. ATSURF is a registered trademark of ICI America Inc., DeMuls is a trade name used by DeFOREST Enterprises, Inc., and Sylfat is a registered trademark of Sylvachem Corporation.

Solids by weight in an aqueous coating material suitable for use in the present invention are in the range of from about 50 to about 70 wt %, preferably from about 55 to about 65 wt %, and more preferably from about 57 to about 60 wt %. When measured by volume, the solids content is from about 35% to about 55% by volume, preferably from about 37.5% to about 50%, more preferably from about 40% to about 45%.

Viscosity of an aqueous coating material suitable for use in the present invention is, as measured by using #2 Signature Zahn Cup, in the range of from about 14" to 22", preferably from about 15" to about 19", and more preferably from about 16" to about 18".

It is another advantage that the aqueous coating material has less than 3.0 pounds per gallon (0.36 kg/liter), preferably less than 1.0 pound per gallon (0.12 kg/liter) of volatile organic compounds (VOC).

It is a further advantage that the coating material is essentially Hazardous Air Pollutant (HAP) free, i.e. HAP being essentially not detectable or 0 after ethylene glycol monobutyl ether (CAS Number 111-76-2) is delisted.

The solids can be distributed in the water based (aqueous) system by many methods known in the art, including but not limited by emulsification, suspension, dispersion, blending and others.

Such various distributions can be achieved by various methods, including, but not limited to addition of a surfactant, addition of an emulsifier, blending, sonic or supersonic treatment, other ways known to those skilled in the art, and combinations thereof. It is preferred to use a suitable surfactant to provide a better dispersion.

The present method and use can be used for treating many different metals and alloys. Both ferrous and non-ferrous metal surfaces can be treated. Examples include, but are not limited to steel (carbon steel, various stainless steel), iron, aluminum, nickel, and others. Preferred metals to be treated include ferrous metals such as iron, carbon steel, stainless steel and the like.

The subject of the metal surface can be of various shape and size. Flat, curved or other types of surfaces can be treated in accordance with the method of the instant invention. A particular use of the method is for treating structural steel joists or other structural steel parts. Any shape of such joists, joist girders, open web and long span steel joist, cold formed steel framing and the like can be treated in accordance with the instant invention.

The metal surface of a subject can be cleaned or treated or not cleaned or treated first prior to making an application of the aqueous coating material. Such cleaning includes, but is not limited to chemical treatment, water cleaning, brazing, sand blasting, heating, and other methods known to those skilled in the art.

Many different application methods can be used to paint or coat the metal surface of a subject. Examples include, but not limited to dipping, spraying, flow painting, and other applications known to those skilled in the art. Dipping is a preferred treatment method because the method can provide more uniform coverage and provides a convenient method of coating metal parts of complex structures. Dipping is particularly preferred when the coated surface is steel joist, open web and long span steel joist, joist girder, cold formed steel framing and the like.

Dip painting [dipping] is carried out when the entire metal, such as steel, structure is completely submerged into a vat or dip tank of paint or coating material, such an aqueous coating material as described herein. To avoid overflows and/or spills, it is preferred that a vat or dip tank should be large enough to accept the metal structure without overflowing. A typical vat or dip tank size varies in a range of from about 20 gallons (75.7 liters) to over 5,000 gallons (18,925 liters) or larger.

Such a vat may adopt any shape to accommodate the shape of the metal structure to be coated/painted.

The dipping can be carried out at a convenient or suitable temperature. Because a preferred coating material is an aqueous system comprising at least one resin, it is preferred that the temperature of the coating material in the dip tank is maintained at a temperature at or below the boiling point of the coating material, typically around 100° C. and above its freezing temperature, typically around 0° C. A preferred range of temperature is from about ambient temperature to about 75° C. If desirable, it is, however, also possible to dip a metal, such as a steel joist, having a temperature higher than the boiling point of the coating material. Care must be taken in such a situation for safety reasons.

The time period for dipping can be varied in accordance with desired result. The dipping can be carried out from a fraction of a second to minutes perhaps even longer. A preferred period for steel joists is in the range of from about 1 second to about 60 seconds, more preferably from about 5 seconds to about 20 seconds, even more preferably from about 10 seconds to about 15 seconds.

After submersion into the coating material in a dipping process, a structure (such as a steel joist) is tilted or moved in such a way or angle to allow excess of the coating material to drain off the structure. In other words, excess of the coating material is removed from the subject of coating process. It is also preferred that such excess of paint or coating material is recovered or captures and returned to the dip tank for reuse. The period for drainage or removal is generally in the range of from about 10 seconds to about 20 minutes.

After sufficient draining time, the coated metal structure/surface or article can be dried. Ambient temperature air dry is one option. In particular, a temperature between about 45° F. (7.2° C.) and about 100° F. (37.8° C.) may be used. The coating can also be forced dried with a flow of air or other gases. In addition, the air or gas or the ambient environment can be heated or cooled during drying. For most uses, it is generally preferred to use a flowing or moving air or gas which is at a temperature higher than the ambient temperature to facilitate water removal.

It is generally also desirable to have a controlled humidity to better control the drying process. In general, the lower the humidity, the faster the coating on the surface is dried.

The thickness of the coating on a metal surface depends on a large number of factors, such as the particular aqueous coating material selected, the metal surface, the application method, the application time and temperature, drainage, drying method, drying temperature, drying time, humidity of the environment, etc. When dipping is the method selected, a thickness of coating is generally in the range of from about 0.5 mils [12.7 μm] to about 1.5 mils [38.1 μm], and preferably from about 0.8 mils [20.3 μm] to about 1.2 mils [30.5 μm].

If desirable, the coated metal surface or the structure can be coated again with either the same aqueous coating material or a different coating material or paint. In other words, the first coat serves equivalently as a primer.

EXAMPLE 1

A steel joist is cooled below 200° F. (93.3° C.) then dipped completely into a tank filled with paint at ambient temperatures between from about 65° F. (18° C.) to about 95° F. (35° C.) for 10-15 seconds then lifted from the tank. The coated joist is allowed to drain for a period of 10 seconds to 20 minutes. The viscosity of the paint should be between 15 and 22 seconds #2 Signature Zahn Cup to deliver 0.8 to 1.2 mils dry film thickness. The joists are then banded and moved to an inside drying area for 30-60 minutes. The banded joists may then be moved to outside storage until transport to the job building sites.

The examples described above are used for illustration purposes only. They are not intended and should not be interpreted to limit either the scope or the spirit of this invention. It can be appreciated by those skilled in the art that many other variations or substitutes can be used as equivalents for the purposes of this invention, which is defined by the written description and the following claims.

What I claim:

1. A method for treating a metal surface of a subject with an aqueous coating material comprising:
   (A) providing the aqueous coating material;
   (B) making an application of the aqueous coating material to the metal surface;
   (C) removing any excess of the aqueous coating material from the subject; and
   (D) drying the coated subject;
      wherein the aqueous coating material comprises water, at least one resin, and at least one emulsifier or surfactant; wherein the resin comprises one or more polymerized C-5 and/or C-9 hydrocarbons and a liquid drying oil
      wherein the resin is characterized by a density of from about 7.8 pounds per gallon (0.936 kg per liter) to about 8.2 pounds per gallon (0.984 kg per liter), a Gardner Color of 3− to 9+, less than 1% volatile matter after 2 hours @ 100° C., and a viscosity of 600-1700 centipoise wherein said viscosity is measured @ 25° C.; and
      the aqueous coating material is characterized by a solids content in the range of from about 50% to about 70% by weight, from about 35% to about 55% by volume; a VOC content of not more than 120 grams per liter excluding water; and a viscosity in the range of from about 20 to about 55 centipoise.

2. The method of claim 1, wherein the application is dipping.

3. The method of claim 2, wherein the metal is steel.

4. The method of claim 3, wherein the subject is a joist and the application is dipping.

5. The method of claim 1, wherein the aqueous coating material further comprises one or more components selected from the group consisting of a biocide, an adhesion promoter, a corrosion inhibitor, a wetting agent, and mixtures thereof.

6. The method of claim 1, wherein the solids content is in the range of from about 55% to about 65% by weight, the VOC content is less than 113 grams per liter excluding water, and the viscosity is in the range of from about 25 to about 35 centipoise.

7. The method of claim 6, wherein the application comprises dipping.

8. The method of claim 7, wherein the metal is steel.

9. The method of claim 8, wherein the metal is a steel joist.

10. A method for treating a steel surface of a joist with an aqueous coating material comprising:
    (A) providing the aqueous coating material;
    (B) dipping the joist into a vat containing the aqueous coating material;
    (C) removing any excess of the aqueous coating material from the joist; and
    (D) drying;
    wherein the aqueous coating material comprises water, at least one resin, and at least one fatty ester emulsifier or one fatty acid surfactant;

the resin comprises one or more polymerized C-5 and/or C-9 hydrocarbons and a liquid drying oil containing at least one copolymer containing one monomer with at least one diallylic group and at least 50% of one or more di-unsaturated acids, 35% of one or more mono-unsaturated acids; and, said resin is characterized by a density of about 7.8 pounds per gallon (0.936 kg per liter) to about 8.2 pounds per gallon (0.984 kg per liter), a Gardner Color of 3–9+, less than 1% volatile matter after 2 hours @ 100° C., and a viscosity of 600-1700 centipoise, said centipoise measured @ 25° C.;

and the aqueous coating material is characterized by a solids content in the range of from about 55% to about 65% by weight, from about 40% to about 50% by volume;

a VOC content of not more than 113 grams per liter excluding water;

a viscosity in the range of from about 20 to about 55 centipoise; and the joist carrying said dried aqueous coating material exhibits 100 or more hours of salt spray resistance as measured by the testing method ASTMB-117.

11. A method for treating the surface of a metal object with an aqueous coating material comprising:
 (A) providing the aqueous coating material;
 (B) applying the aqueous coating material to the surface of said metal object;
 (C) removing any excess aqueous coating material from the said metal object; and
 (D) drying the coating material on the surface of the metal object thereby yielding a metal object having a coating of said aqueous coating material;
  wherein the aqueous coating material comprises water, at least one resin, and at least one emulsifier or surfactant; wherein the resin comprises one or more polymerized C-5 and/or C-9 hydrocarbons and a liquid drying oil, said resin having a viscosity of 600-1700 centipoise when said viscosity is measured @ 25° C.; and
  the aqueous coating material has a solids content in the range of from about 50% to about 70% by weight, a VOC content of not more than 120 grams per liter excluding water; and a viscosity in the range of from about 20 to about 55 centipoise.

12. The method of claim 11, wherein said step of applying said aqueous coating material to said metal object entails dipping said metal object into a container of said aqueous coating material.

13. The method of claim 11, wherein the aqueous coating material further comprises one or more components selected from the group consisting of a biocide, an adhesion promoter, a corrosion inhibitor, a wetting agent, and mixtures thereof.

14. The method of claim 11, wherein said metal object is a steel joist.

* * * * *